(12) United States Patent
Dimou

(10) Patent No.: US 7,761,772 B2
(45) Date of Patent: Jul. 20, 2010

(54) USING NO-REFRESH DRAM IN ERROR CORRECTING CODE ENCODER AND DECODER IMPLEMENTATIONS

(75) Inventor: Georgios D. Dimou, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 322 days.

(21) Appl. No.: 11/860,481

(22) Filed: Sep. 24, 2007

(65) Prior Publication Data

US 2008/0098279 A1   Apr. 24, 2008

Related U.S. Application Data

(60) Provisional application No. 60/829,916, filed on Oct. 18, 2006.

(51) Int. Cl.
*G11C 29/00* (2006.01)
(52) U.S. Cl. .................... 714/763; 714/702; 714/755
(58) Field of Classification Search ................ 714/702, 714/755, 763
See application file for complete search history.

(56) References Cited

U.S. PATENT DOCUMENTS

| | | | |
|---|---|---|---|
| 5,751,741 A * | 5/1998 | Voith et al. ................. 714/758 |
| 6,163,871 A | 12/2000 | Yang | |
| 6,484,283 B2 * | 11/2002 | Stephen et al. .............. 714/786 |
| 6,735,734 B1 * | 5/2004 | Liebetreu et al. ............ 714/775 |
| 6,799,295 B2 * | 9/2004 | Nguyen ..................... 714/794 |
| 6,813,742 B2 * | 11/2004 | Nguyen ..................... 714/794 |
| 6,854,077 B2 * | 2/2005 | Chen et al. .................. 714/702 |
| 7,065,696 B1 | 6/2006 | Liu | |
| 7,100,101 B1 * | 8/2006 | Hemphill et al. ............ 714/755 |
| 7,343,530 B2 * | 3/2008 | Shin .......................... 714/702 |
| 2004/0221098 A1 | 11/2004 | Ito | |
| 2004/0237023 A1 | 11/2004 | Takahashi et al. | |

* cited by examiner

*Primary Examiner*—Esaw T Abraham
(74) *Attorney, Agent, or Firm*—Townsend and Townsend and Crew LLP

(57) ABSTRACT

Embodiments of the present invention provide Forward Error Correcting Code encoders and decoder structures that use DRAM in their memory designs. DRAM is a very attractive memory options in many electronic systems due to the high memory density provided by DRAM. However, the DRAM is typically not included in ASIC or FPGA implementations of encoders and decoders due to complex refresh requirements of DRAM that are required to maintain data stored in DRAM and may interfere with user access to the memory space during refresh cycles. Embodiments of the present invention provide FECC encoder and decoder structures that are implemented using DRAM that do not require complex refresh operations to be performed on the DRAM to ensure data integrity. Accordingly, embodiments of the present invention maximize memory density without the added complexity of introduced by the refresh requirements of DRAM.

18 Claims, 2 Drawing Sheets

USING NO-REFRESH DRAM IN ERROR CORRECTING CODE ENCODER AND DECODER IMPLEMENTATIONS

CROSS-REFERENCES TO RELATED APPLICATIONS

This application claims the benefit of U.S. Provisional No. 60/829,916, filed on Oct. 18, 2006, the full disclosure of which is incorporated herein by reference.

BACKGROUND OF THE INVENTION

The present invention relates generally to data encoding and in particular to error correcting code encoder and decoders.

The transmission of data through a noisy channel could introduce errors into the data stream. In order to reduce the amount of errors in the transmitted sequence and to avoid retransmissions coding techniques have been developed that provide the ability to detect and correct errors in a sequence. This is achieved usually through the addition of redundant information as part of the transmission. Here the term transmission is used broadly to include transfer of data through different types of medium. This can include communication mediums such as those used in wired, wireless, satellite, and other technologies. This can also include storage mediums such as magnetic, semiconductor, and other types of memory.

Some of the most popular and powerful coding techniques use Forward Error Correcting Codes (FECC) that operate on blocks of data rather than streams of data, such as Parallel Concatenated Convolutional Codes (PCCC or Turbo), Serially Concatenated Convolutional Codes (SCCC) Low Density Parity Check Codes (LDPCC), Turbo Product Codes (TPC) and other Turbo-Like Codes (TLC). Although all these codes differ significantly in terms of the code structure, they share some common features. First, they all operate on the data on a block basis, meaning that the data is not encoded in a continuous stream, but rather partitioned in blocks of a predetermined size. Second, all these codes use iterative decoding methods, therefore they generally require that a block of data is stored in memory and accessed several times before the results of the encoding and decoding processes become available. Finally it is well known that all these codes can achieve better performance against noise, but also better data rates as the data block size increases.

Therefore, there are many benefits associated with larger block sizes and it would be beneficial to be able to use as large of a block size as possible in all these cases. One obvious problem however that is related to all these coding structures is memory usage. Generally speaking, the memory usage directly translates to physical memory area on a chip (field programmable gate array (FPGA), application-specific integrated circuit (ASIC) or custom very-large-scale integration (VLSI) chip) that implements such a code and therefore higher implementation cost. With even small block sizes, it is often the case that the size of the processing logic in the implementation is comparable or even sometimes several times smaller than the size of the memory required for storing the data.

Designers are hence forced to trade between performance and memory area in order to achieve an implementation that can satisfy their requirements using less memory area. The purpose of this invention is to show that there exist special area-efficient memory types that are ideally suited for use in such coding structures so that the memory area cost associated with a given implementation is significantly smaller than the one required when using commonly used memory structures.

FIG. 1 is block diagram of a prior art parallel concatenated convolutional code (PCCC) FECC 100. PCCC 100 receives a single input signal and outputs two encoded output signals that each includes an encoded version of the input signal. To produce the first output signal, the input signal is convolutionally encoded prior to output. To produce the second output signal, the input signal is first interleaved and then convolutionally encoded prior to output.

PCCC 100 includes an interleaver 110, a first convolution code module (CC) 120, and a second convolution code module (CC) 130. PCCC 100 receives an input signal to be encoded, and the input signal is passed to interleaver 110 and to CC 120. CC 120 convolutionally encodes the input signal and outputs a first encoded output signal. Interleaver 110 interleaves the input signal and outputs the interleaved signal. CC 130 receives the interleaved signal as an input and convolutionally encodes the interleaved signal. CC 130 then outputs the encoded signal as the second encoded output signal.

Interleaving and convolutional encoding are two means of error correction that are well known in the art. Data interleaving may be used to protect against burst errors in a transmission that may overwrite a number of bits in a transmission. Data to be transmitted is often broken up into a plurality of control words and each of these control words may be self-correcting up to a certain number of bits. For example, an n-bit control word may be 1-bit self-correcting, meaning that if 1 bit of the n bits comprising the control word is overwritten or lost in transmission, the error can be detected and corrected. However, if an error comprising 2 or more bits occurs, the error cannot be self-corrected, and depending upon the decoding algorithm being applied the code word may either fail to be decoded or a the false positive may result where the decoding algorithm misidentifies the code word as a different code word due to the error.

The control words may then be interleaved to further protect against burst errors. For example, the i-th bit of each n-bit control words may be transmitted, then the i+1th bit of each n-bit control word may be transmitted, and so on until each bit of a group of the first n code words has been transmitted. Thus, if a burst error occurs, the number of bits lost from any one code word is likely to be minimized.

Convolutional coding is another type of self-correcting code. Convolutional encoding transforms an m-bit control word into an n-bit symbol (where $n \geq m$) and the transformation is a function of the last k information symbols with k being the constraint length of the code.

One skilled in the art will recognize that the methods for interleaving data and for convolutional encoding of data described herein are merely exemplary and that other methods for interleaving and convolutional encoding might also be used in alternative implementations.

FIG. 2 is a block diagram of a prior art serially concatenated convolutional code (SCCC) FECC 200. Like the PCCC described above, a SCCC includes two convolutional encoder modules and an interleaver, but instead of producing two separate encoded output signals, the input signal is serially encoded by both convolutional encoder modules.

SCCC 200 includes a first convolution coder module (CC) 210, an interleaver 220, and a second convolution coder (CC) module 230. CC 210 receives an input signal to be encoded and performs a first convolutional coding step on the data. CC 210 outputs the encoded data, and interleaver 220 receives the encoded data as an input. Interleaver 220 interleaves the data and outputs the interleaved data. CC 230 receives the interleaved data and performs a second convolutional coding step on the data. CC 230 then outputs the encoded data.

FIG. 3 is a block diagram of a prior art hybrid concatenated convolutional code (Hybrid CCC) FECC 300. Like PCCC 100 described above, hybrid CCC 300 produces two output data signals. The first output data signal is identical to the input signal, and the second output data signal is identical to that which is produced by SCCC 200 described above.

Hybrid CCC 300 includes a first convolutional code module (CC) 310, an interleaver 320, and a second convolutional code module (CC) 330. Hybrid CCC 310 produces a first output signal that is identical to the input signal. CC 310 also receives the input signal as an input. CC 310 performs a first convolutional encoding step on the input signal and outputs the encoded data. Interleaver 320 receives the encoded data as an input. Interleaver 320 interleaves the encoded data and outputs the interleaved data. CC 330 receives the interleaved data as an input and performs a second convolutional encoding step on the data. CC 330 then outputs the encoded data.

In virtually all FPGA and ASIC implementations of FECCs, such as those depicted in FIGS. 1-3, designers use static RAM (SRAM) memories. SRAM is typically used, because SRAM reliably retains data in memory so long as the SRAM so long as the power supply to the SRAM remains applied. Data can be read from and/or written to an SRAM cell as many times as required, without having to take addition steps to preserve the contents of the memory cell.

A typical SRAM cell requires six transistors. However, some alternative implementations exist where the SRAM cells comprise four transistors and two resistors. Regardless of which type of SRAM implementation is selected, SRAM is generally considered to be a bulky memory solution. The memory density of RAM modules constructed from is typically low. Thus, in systems requiring a lot of memory, the RAM modules may occupy a lot of space in an electronic device.

FECC encoders and/or decoders may be integrated into numerous portable electronic devices such as laptop computers, mobile phones, and/or other portable devices that include electronic communications capabilities. The form factor of receiver and transmitter components may be directly impacted by components such as FECC encoders and/or decoders such as those described above. Electronics designers and manufacturers attempt to minimize the footprint of the individual components of the devices that they are designing and producing in order to minimize the manufacturing costs as well as minimize the form factor of the electronic device.

Accordingly, a solution that advantageously addresses the performance and implementations problems presented in conventional FECCs is desired.

BRIEF SUMMARY OF THE INVENTION

Typical FPGA and ASIC implementations of Forward Error Correcting Codes (FECC) use static RAM (SRAM). Embodiments of the present invention advantageously address the problems described above, and others, associated with using SRAM in FECCs by using DRAM to implement memory modules of FECC encoders and decoders. One disadvantage of using SRAM to implement memory modules is that SRAM cells are larger and require much more area than DRAM cells. Typical SRAM cells are implemented using six transistors per bit of storage, while typical DRAM cells merely require one transistor per bit of storage.

According to an embodiment, a method for utilizing memory to perform error correction code (ECC) operations is provided. The method includes generating data to be operated upon according to an ECC operation, temporarily storing the data to be operated upon in volatile memory capable of maintaining stored data values for a limited time duration, reading the data to be operated upon from the volatile memory prior to expiration of the limited time duration, and performing the ECC operation on the retrieved data. According to some embodiments, the volatile memory is DRAM. Furthermore, according to some embodiments, the ECC operation is an encoding operation. According to yet other embodiments, the ECC operation is a decoding operation. According to other embodiments, the ECC operation is part of an iterative ECC process. According to yet other embodiments, DRAM is used to implement an input buffer, while in some embodiments, DRAM is also used to implement an output buffer. In some embodiments, DRAM is used to implement at least one of an interleaver operation and a de-interleaver operation. According to some embodiments, the data to be operated upon is read multiple times from the volatile memory, each read being associated with a refresh operation on the data, the refresh operation extending the limited duration by which the volatile memory maintains stored data.

Other features and advantages of the invention will be apparent in view of the following detailed description and preferred embodiments.

DETAILED DESCRIPTION OF THE INVENTION

Figure 1:
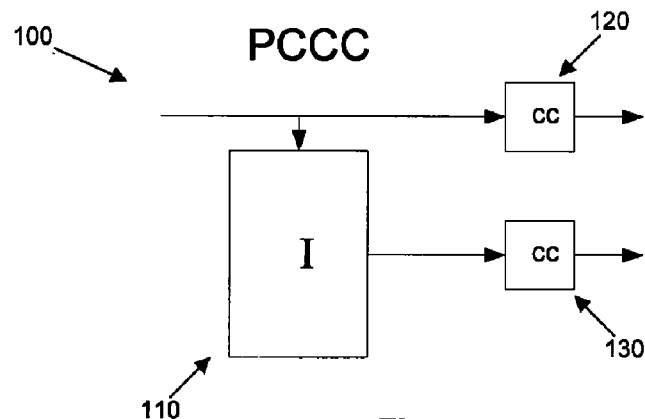
FIG. 1 is block diagram of a prior art parallel concatenated convolutional code FECC.
Figure 2:
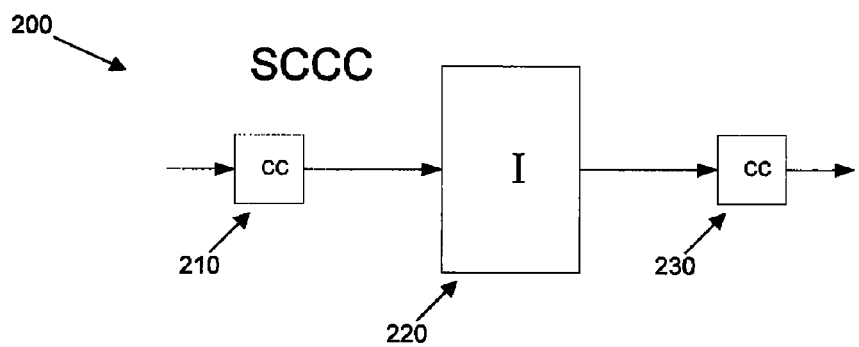
FIG. 2 is a block diagram of a prior art serially concatenated convolutional code FECC.
Figure 3:
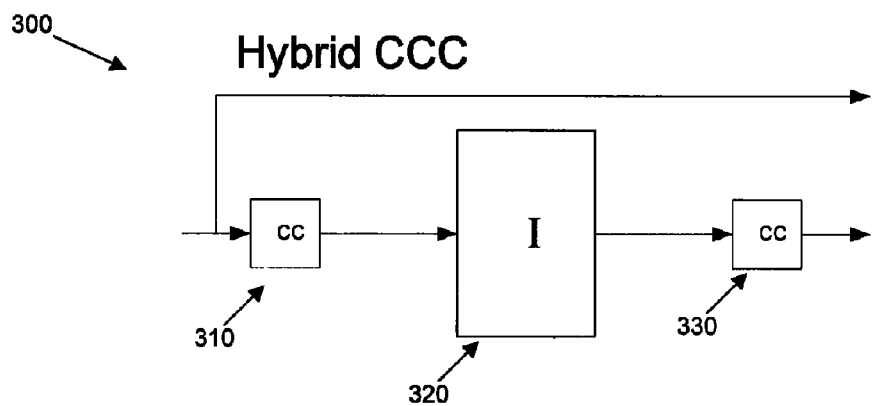
FIG. 3 is a block diagram of a prior art hybrid concatenated convolutional code FECC.

One skilled in the art will recognize that the teachings of the figures and this disclosure as depicted as examples of implementations of the present invention, and that many other implementations are possible without departing from the present invention.

As described above, virtually all FPGA and ASIC implementations of FECCs, designers use static RAM (SRAM) memories. SRAM is typically used, because SRAM reliably retains data in memory so long as the SRAM so long as the power supply to the SRAM remains applied. Data can be read from and/or written to an SRAM cell as many times as required, without having to take addition steps to preserve the contents of the memory cell.

A typical SRAM cell requires six transistors. However, some alternative implementations exist where the SRAM cells comprise four transistors and two resistors. However, SRAM is considered to be a bulky memory solution regardless of the implementation. The memory density of RAM modules constructed from SRAM modules is generally typically low, particularly when compared to RAM modules constructed from dynamic RAM (DRAM) cells.

DRAM cells may be found in one of several different implementations. In the most common implementation, DRAM cells comprise one transistor and a capacitor per bit of storage as compared to SRAM cells which include six transistors per bit of storage. As a result, DRAM memory modules may advantageously provide much higher memory density than SRAM memory modules.

DRAM, however, is not static memory. DRAM cannot maintain the values stored in the memory for long periods of time, and without periodic refreshes, the data stored in the DRAM will be lost.

DRAM is comprised of a plurality of cells that include a capacitor. A charge is deposited in the capacitor when data is written to the DRAM. However, the capacitor slowly discharges over time. This discharge of the capacitor may be caused, for example, by leakage current in the cells of the DRAM or by exposure to radiation from external sources. Accordingly, in most general purpose applications using DRAM, the data stored in the DRAM must be periodically refreshed. Otherwise, the data stored in the DRAM will be lost as the capacitors of the DRAM discharge.

Each memory location or memory cell in the DRAM must be refreshed before the capacitors within the memory cells discharge. The time interval in which a refresh must be performed to prevent the loss of data due to discharge of the capacitors of the memory cells is referred to as the refresh cycle for the DRAM.

A typical DRAM includes specialized circuitry for controlling refresh operations implemented either inside or outside of the core of the DRAM. The refresh circuitry typically implements complex algorithms for scheduling refresh operations to minimize the disruption to the operation of the RAM as a result of refresh operations. During a refresh operation, the portions of the memory being refreshed are usually inaccessible for user purposes, meaning that data stored in those portions of the memory cannot be read nor can data be written to those portions of the memory until the refresh is completed. Some DRAM implementations include redundant circuitry for storing multiple copies of data to ensure that at least one copy of the data can be read from or written to during a refresh. However, adding redundant circuitry to store multiple copies of data within the DRAM may significantly increase the footprint of the memory and may also significantly increase the cost of producing the memory.

Due to these limitations of DRAM, DRAM has only been adopted for use in some very specific applications by electronics manufacturers and is typically used in applications that perform standard well-defined operations (such as personal computers). DRAM typically has not been used in applications that include custom chip designs (such as ASICS). For example, in many custom chip designs, the idle time available for refreshing the RAM may be insufficient to allow DRAM to be used and/or user requirements for a particular application may not allow for access to the memory to be stalled for any reason.

Embodiments of the present invention, however, provide FECC implementations that exclusively include DRAM cells without requiring refresh operations to be implemented for any of the memories used in the implementation. Accordingly, embodiments provide implementations that advantageously replace SRAM in each of the memory units of FECC encoders and/or decoders in order to provide higher memory density. Thus, the area required to implement an electronic device incorporating embodiments of FECC encoders and/or decoders according to embodiments may be advantageously decreased. As a result, the overall form factor of the device may minimized in addition to reducing manufacturing costs by replacing more complex SRAM modules with less complex DRAM.

Various embodiments of the present invention recognize that the data inside of a FECC implementation may have certain characteristics that make DRAM particularly well suited for these kinds of applications. Data in ECC decoders and encoders typically has a very short useful life span. In most instances, the data is only accessed once, and the data is typically processed in a very short amount of time that is generally much smaller than the refresh period required to maintain data in a DRAM cell. Therefore, DRAM without refresh functionality may be used for all of the RAM structures included in FECC encoders and decoders.

However, according to some embodiments, one exception where DRAM might not be used to replace SRAM is in the input buffer of the decoder. The input buffer of the decoder is used to store samples of data to be decoded as they are received by the decoder. According to some embodiments, the input buffer may store the actual samples of the incoming data. In other embodiments, the input buffer may instead store metrics that have been extracted from the samples of incoming data and stored in a format appropriate for the particular type of decoder. The data in the input buffer may be read multiple times when decoding data using iterative codes such as Parallel Concatenated Convolutional Codes (PCCC), Serially Concatenated Convolutional Codes (SCCC), Low-Density Parity Check Codes (LDPCC), and other Turbo-Like Codes (TLC).

Performing a read on DRAM to retrieve data stored in the memory may also shorten the period of time that the DRAM can maintain the data stored therein without refreshing the DRAM. Thus, DRAM with no refresh capability may not be appropriate where iterative decoding methods that require repeated reads of the data in the input buffer, such at those described above, are in use in the decoder. One solution is to use refresh-on-read DRAM to implement the input buffer of the decoder. Refresh-on-read DRAM will perform a refresh on the data in the DRAM when data contents of the memory are read. Refresh-on-read DRAM merely includes logic for updating those memory cells that are accessed during a read operation and does not include logic for performing periodic refresh cycles the entire memory. Only those memory cells which are accessed during a read are refreshed. Refresh-on-read DRAM will typically require more area to implement than DRAM without any refresh circuitry, and thus, may not be able to achieve the same levels of memory density that may be possible with thorough the use of DRAM without refresh logic included. However, read-on-refresh DRAM typically include simpler refresh circuits than DRAM with full refresh cycle logic. Therefore, refresh-on-read typically requires less area than DRAM with full refresh logic include and can therefore still achieve higher memory density that DRAM with full refresh logic (even if the memory density may be less than that which could be achieved through the use of DRAM without any refresh circuitry).

As described above, FECCs partition data into blocks of a predetermined size which are then encoded. Encoding is typically one of the last data processing steps performed by a transmitter before the data is transmitted. Encoding logic is typically integrated into the physical (PHY) layer of the transmitter.

During the encoding process, supplemental data to aid the receiver in determining if errors were introduced into the data during transmission are appended to the data comprising information to be transmitted. This additional data, usually referred to as parity information, is a function of the original data and is generated using an error correcting code, such as PCCC, SCCC, LDPCC or TLC.

The complexity of error correcting codes has continued to increase, and as a result, the amount of memory required to support these error correcting codes has also increased due to the size and complexity of the data structures used by these codes. As the complexity of these codes has increased, both the encoding and decoding data structures have typically increased substantially in size and complexity. However, the impact on the decoder structure size is typically greater, since each original bit of data corresponding to information to be transmitted is often represented by a metric that is several bits wide in the decoder structure. As a result, constraints on memory may be even greater in a receiver performing decoding than in a transmitter that has encoded the original signal.

A typical FECC encoder structure has several memory structures to store data at the various points of processing, including an input buffer, an interleaver memory, a pre-transmission memory, and/or last-in first-out (LIFO) or first-in first-out (FIFO) buffers in used in various subcomponents for use in data throttling. According to some embodiments, the encoder may have an input buffer for buffering the incoming data before the data is processed. An input buffer is, however, a performance-driven optional feature and may not be included in some low-throughput embodiments.

Interleaver memories are a second type of memory structure typically found in advanced FECCs, such as PCCC, SCCC, LDPC, TLC, and TPC. According to some embodiments, an interleaver memory may be implemented as a single block, while in other embodiments, the interleaver memory may be implemented a several blocks of memory. The implementation selected for the interleaver memory may depend, at least in part, on the throughput requirements of the system.

Advanced FECCs also typically include another memory structure for storing bits to be transmitted prior to the formation of final symbols to be transmitted across a channel. According to some embodiments, interleaving may also be performed on the data in this pre-transmission memory.

Some embodiments of FECCs may also include various FIFO buffers incorporated into subcomponents of the FECCs. The FIFO buffers are typically smaller than the other memory structures described above and are used to provide data throttling capabilities to the various subcomponents by regulating the flow of data into and/or out of the various subcomponents of the FECCs. The properties of the various memory blocks included in a FECC are described in greater detail below. The FIFO buffers are not described separately as these buffers share many of properties of the other major memory blocks that may be included in an FECC.

Figure 4:
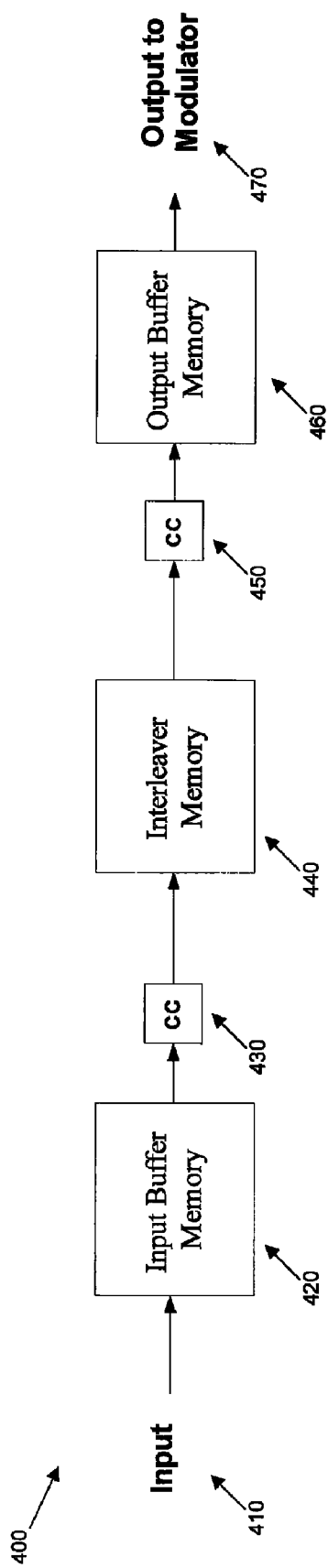
FIG. 4 is a block diagram of an encoder according to an embodiment.

FIG. 4 is a block diagram of an encoder according to an embodiment. Encoder 400 comprises input 410, input memory buffer 420, convolution code unit (CC) 430, interleaver memory 440, convolution code unit (CC) 450, output buffer memory 460, and output 470.

Data flows in one direction in the encoder from input 410 to output 470. As data flows from input 410 toward output 470, the data is only written to and read from memory at each of the memory blocks: input memory buffer 420, interleaver memory 440, and output memory buffer 460. According to some embodiments, encoder 400 may also include FIFO buffers in one or more of the encoder components, such as CC 430 and/or CC 450 for controlling the flow of data into these components.

CC 430 reads data from input memory 420, encodes the data, and writes the data interleaver memory 440. CC 450 then reads the encoded data from interleaver memory 440, performs a secondary encoding step on the encoded data, and writes the modified encoded data to output buffer memory 460. The encoded data is read out of output buffer memory 470 and output to modulator 470 that modules a carrier signal in order to convey the encoded data to a receiver. The structures of the modulator and other downstream components that may be included in a system including the modulator have been omitted.

The lifetime of the data in each of the memory blocks in the system is very short. The processing times required for each of the components that are reading from and/or writing to the memory blocks is typically much faster than the refresh cycle for the DRAM comprising each of the memory blocks. Even the largest blocks of data that may be used by encoding methods are typically small enough that the data can be read out from memory much faster than the refresh cycle. The, DRAM that does not include refresh logic typically may be used in each of the memory components of the encoder and/or decoder. DRAM that does not include refresh logic is less complex and requires a smaller footprint, allowing more memory to be included in a smaller device. The use of DRAM without refresh logic may provide significant manufacturing cost savings and also enable devices incorporating the encoder to have smaller form factors (an important consideration for portable devices such as mobile phones, etc.).

One skilled in the art will recognize that the same building blocks described for FIG. 4 could also be used to implement other types of encoders such as the PCCC and the Hybrid CCC described above.

Figure 5:
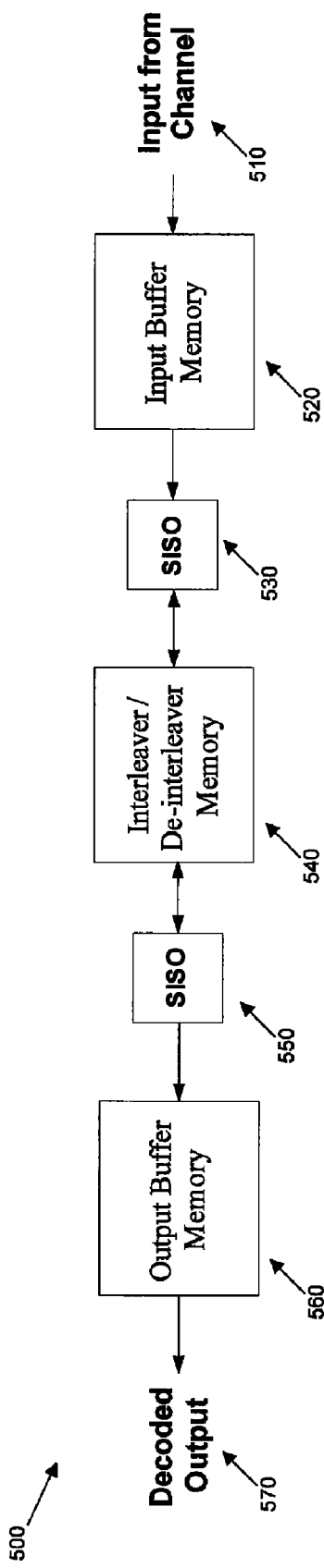
FIG. 5 is a block diagram of a decoder according to an embodiment.

FIG. 5 is a block diagram of a decoder according to an embodiment. Decoder 500 comprises input 510, input memory buffer 520, soft-input/soft-output unit (SISO) 530, interleaver/de-interleaver memory 540, soft-input/soft-output unit (SISO) 550, output memory buffer 560, and output 570. Decoder 500 receives input data to be decoded, such as data encoded by encoder 500 described above, via input 510. The input data from input 510 is stored in input buffer memory 520.

Data flows through interleaver/de-interleaver memory 540 in both directions in decoder 500, because the decoding process, unlike the encoding process, is iterative. SISO 530 and SISO 550 perform multiple iterations on the data in order to determine in order to identify which symbol was received by the decoder. Once an acceptable level of certainty has been reached, the symbol is identified and the decoding process continues with the next received symbol.

In embodiments of decoders implementing earlier FECC designs, the data is only decoded once and only needs to be read from memory once. Therefore, the use of DRAM with no refresh in all of the memory blocks of the decoder is preferred in order to maximize memory density. However, according to some alternative embodiments, some memory blocks may be implementing using SRAM or other types of memory.

In embodiments implementing advanced FECC designs (such as those described above), the decoding process is iterative in advanced FECC designs. The data received for a particular block is typically iterated upon several times before making a decision. Iterative decoders use soft metrics to represent the probabilities that a certain set of bits were transmitted instead of the actual bits values. Iterative decoders also need to store the entire block of information for the iterative process. Therefore iterative decoders may require a lot more memory for storing data during the decoding process in contrast with older FECCs that immediately make binary decisions as to what set of bits were transmitted based upon the input data received.

In a typical advanced FECC decoder structure, three large memory structures constitute the bulk of the memory space used in the design: an input buffer memory, an interleaver/de-interleaver memory, and output memory buffer. According to some embodiments, various subcomponents of the decoder may also include smaller memory modules, such as LIFO memory buffers and FIFO memory buffers. For example, SISO 530 and/or SISO 550 and/or other subcomponents may include an memory buffer used to provide data throttling capabilities to the various subcomponents by regulating the flow of data into and/or out of the various subcomponents of the FECCs.

Interleaver/de-interleaver memory 540 records and transfers data between the SISO modules of decoder 500. The transfer process is iterative, so data flows in both directions (in contrast to the FECC encode described above in which data only flows in one direction), and because the data flows in both directions, the interleaver module will typically include both interleaving and de-interleaving functions. In many embodiments, the interleaving and de-interleaving functions are implemented in a single module. However, in other embodiments, the interleaving and de-interleaving functionality may be implemented in separate modules.

The data in interleaver/de-interleaver memory 540 is only read once by one of the SISO modules before being modified and rewritten into memory by the SISO module. Thus, the data is only valid for a single iteration of the decoder. Iterations follow one another very closely, and information typically remains in interleaver/de-interleaver memory 540 for a period of time that is much shorter in duration than the refresh cycle of DRAM. Accordingly, embodiments may advantageously use DRAM without refresh circuitry to implement interleaver/de-interleaver memory 540 in order to maximize memory density in interleaver/de-interleaver memory 540. However, alternative embodiments may include DRAM with refresh circuitry, such as a full refresh cycle and/or refresh-on-read circuitry.

Output memory buffer 560 is only written to at the end of processing. The data that is written to output memory buffer 560 only remains in the buffer for a very brief period of time before the data is sent to output 570. The data will typically be read out of output memory buffer 560 one time before being output from decoder 500 via output 570. The period of time that the data remains in output memory buffer 560 is typically much shorter in duration than the refresh cycle of DRAM. Accordingly, embodiments may also advantageously use DRAM without refresh to implement output memory buffer 560 in order to maximize memory density in output memory buffer 560. However, some alternative embodiments may implement output memory buffer 560 with DRAM that includes refresh circuitry, such as a full refresh cycle and/or refresh-on-read circuitry.

Various subcomponents such as SISO 530 and/or SISO 550 may include small memory buffers, such as for regulating the flow of data into and/or output of a subcomponent. According to some embodiments, theses small memory buffers may also be implemented using DRAM, since the data stored in theses buffers is typically only read once and is typically read and processed in less than one refresh cycle.

Input memory buffer 720 is the only block in the decoder that stores data that may be required to be read multiple times without being overwritten during the iterative decoding process. At least a portion of the data stored in input memory buffer 720 is typically read during each iteration, and by the time that decoding process has been completed, all of the data should have been read. Accordingly, some embodiments implement input memory buffer 720 using DRAM with refresh-on-read circuitry to enable the DRAM to be able to maintain the data in memory long enough for the iterative decoding process to be completed. However, according to some alternative embodiments, DRAM with a circuitry implementing a full refresh cycle may also be used to implement input memory buffer 720.

The various embodiments described above illustrate that DRAM without refresh functionality may be used to implement the various memory modules included in FECC encoders and/or decoders, since the data used by encoder and/or decoders typically has a lifespan that is shorter than the refresh cycle for the DRAM. The data is typically read only once and is processed quickly enough by the encoder and/or decoder modules that the capacitors in the DRAM cells should not have time to lose their charge. Therefore, according to most embodiments, all of the memory modules in an FECC encoder and/or decoder may be implemented using the minimum-sized DRAM (1T) memories without the need for refresh circuitry. However, according to some embodiments, DRAM including refresh-on-read circuitry may be used for the input buffer for an FECC decoder. In particular, the refresh-on-read circuitry may be included in the DRAM of memory modules that must be read multiple times. For example, many of the advanced FECC encoders described above are iterative, and thus require that the data in the input buffer be read multiple times during processing. Only those memory buffers which are to be read multiple times need to have refresh logic included, only refresh-on-read circuitry is required rather than full refresh cycle.

To illustrate this point, consider the following worst case scenario where the decoder is operating with a 100 MHz clock and the frame size of the input data is 16 Kbits. The average lifespan of the data for encoders and/or decoders with no concurrency will only be approximately 160 μsec. The DRAM refresh cycle is usually several milliseconds long. Thus, the average lifespan of the data will be significantly shorter than the refresh cycle for the DRAM. Therefore, even without a refresh cycle, the DRAM will be able to store the data much longer that in necessary for the encoder and/or decoder to complete processing.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for utilizing memory to perform error correction code (ECC) operations, the method comprising:

obtaining data to be operated upon according to an ECC operation;

temporarily storing the data to be operated upon in volatile memory configured for maintaining stored data values for a time duration with an expiration;

reading the data to be operated upon from the volatile memory prior to the expiration of the time duration, wherein the data to be operated upon is read once from the volatile memory without performing any refresh operation on the data; and performing the ECC operation on the retrieved data.

2. The method of claim 1 wherein the volatile memory comprises Dynamic Random Access Memory (DRAM).

3. The method of claim 2 wherein the DRAM is used to implement an input buffer.

4. The method of claim 2 wherein the DRAM is used to implement an output buffer.

5. The method of claim 2 wherein the DRAM is used to implement at least one of an interleaver operation and a de-interleaver operation.

6. The method of claim 1 wherein the ECC operation is an ECC encoding operation.

7. The method of claim 1 wherein the ECC operation is an ECC decoding operation.

8. The method of claim 1 wherein the ECC operation is part of an iterative ECC process.

9. The method of claim 1 wherein the data to be operated upon is read multiple times from the volatile memory, each read being associated with a refresh operation on the data, the refresh operation extending the limited duration by which the volatile memory maintains stored data.

10. An apparatus configured to utilize memory to perform error correction code (ECC) operations, the apparatus comprising:

volatile memory configured for maintaining stored data values for a time duration with an expiration; and an ECC module comprising:

logic to obtain data to be operated upon according to an ECC operation;

logic to send the data to be operated upon to the volatile memory for temporary storage;

logic to read the data to be operated upon from the volatile memory prior to the expiration of a the time duration, wherein the ECC module is configured to read the data to be operated upon from the volatile memory without performing any refresh operation on the data; and logic to perform the ECC operation on the retrieved data.

11. The apparatus of claim 10 wherein the volatile memory comprises Dynamic Random Access Memory (DRAM).

12. The apparatus of claim 11 wherein the DRAM is used to implement an input buffer.

13. The apparatus of claim 11 wherein the DRAM is used to implement an output buffer.

14. The apparatus of claim 11 wherein the DRAM is used to implement at least one of an interleaver operation and a de-interleaver operation.

15. The apparatus of claim 10 wherein the ECC operation is an ECC encoding operation.

16. The apparatus of claim 10 wherein the ECC operation is an ECC decoding operation.

17. The apparatus of claim 10 wherein the ECC operation is part of an iterative ECC process.

18. The apparatus of claim 10 wherein the ECC module is configured to read the data to be operated upon multiple times from the volatile memory, each read being associated with a refresh operation on the data, the refresh operation extending the limited duration by which the volatile memory maintains stored data.

* * * * *